United States Patent [19]

Vanderwerf

[11] 4,385,808
[45] May 31, 1983

[54] POINT FOCUS REFRACTING RADIATION CONCENTRATOR

[75] Inventor: Dennis F. Vanderwerf, Cottage Grove, Minn.

[73] Assignee: Minnesota Mining and Manufacturing Company, Saint Paul, Minn.

[21] Appl. No.: 204,022

[22] Filed: Nov. 4, 1980

[51] Int. Cl.³ .............................................. G02B 3/08
[52] U.S. Cl. .................... 350/452; 126/438; 126/439
[58] Field of Search ................ 350/452, 293; 126/439, 126/440, 438

[56] References Cited

U.S. PATENT DOCUMENTS

| | | |
|---|---|---|
| 3,203,306 | 8/1965 | Lefferts . |
| 4,069,812 | 1/1978 | O'Neill . |
| 4,108,540 | 8/1978 | Anderson et al. . |
| 4,118,114 | 10/1978 | Anderson et al. . |
| 4,165,734 | 8/1979 | Schmidt . |
| 4,257,401 | 3/1981 | Daniels . |
| 4,301,321 | 11/1981 | Bartels .............................. 350/293 |
| 4,315,671 | 2/1982 | Bunch ............................... 126/440 |

FOREIGN PATENT DOCUMENTS 1447073 11/1968 Fed. Rep. of Germany .
WO70/00173 4/1979 PCT Intl. Appl. .

Primary Examiner—John K. Corbin
Assistant Examiner—P. M. Dzierzynski
Attorney, Agent, or Firm—Cruzan Alexander; Donald M. Sell; William D. Bauer

[57] ABSTRACT

A point focus radiation concentrator using two linear echelon surfaces crossed at approximately 90 degrees with the two linear echelon surfaces having a generally cylindrical shape with a radius of curvature approximately equal to the focal distance. The two echelon surfaces may be formed on separate sheets positioned in close proximity to each other or may be formed on opposite sides of a single sheet. The cross section of the curved concentrator surface may be circular or other aspherical shape, such as parabolic, ellipsoid and hyperbolic.

16 Claims, 10 Drawing Figures

POINT FOCUS REFRACTING RADIATION CONCENTRATOR

BACKGROUND OF THE INVENTION

The present invention relates generally to radiation concentrators and more particularly to point focus radiation concentrators using crossed linear Fresnel lens. The present invention relates even more particularly to radiation concentrators utilized for concentrating solar radiation.

Fresnel lens (echelon lens) are well known and are known to be useful to replace conventional lenses for focusing or refracting radiation. Fresnel lenses can be either annular echelon lenses or linear echelon lenses.

Annular echelon lenses (surfaces) can be used quite well to point focus radiation. Such an annular echelon surface has a high focusing accuracy; however, the size of annular echelon surfaces are limited. Due to the necessity of having a machine, a ruling engine, to cut the master surface as large as the surface being produced, in order to have a three-unit diameter annular echelon lens, it would be necessary to have a ruling engine capable of cutting the master having a size of at least three units in diameter. Since the maximum size of the ruling engine is practically limited, the size of the resulting annular echelon surface is also limited.

Normally a linear echelon surface is used for line focusing. When two linear echelon surfaces are crossed (oriented) at 90 degrees with respect to each other, the combination approximates an annular echelon lens. Incident radiation along the orthogonal meridians of each linear echelon surface can be made to converge quite well to a point focus. The advantage in using linear echelon surfaces is that very large concentrating arrays can be formed by the matrix sectioning of the radiation concentrator into individual linear echelon surfaces. This matrix sectioning is shown by U.S. Pat. No. 4,108,540, Anderson et al, entitled Refractor-Reflector Radiation Concentrator, assigned to the same assignee as the present invention.

Crossed linear echelon surfaces, however, suffer the disadvantage that while radiation incident along the orthogonal meridians converge, radiation incident away from these meridians, for example, radiation incident at a corner of the crossed linear echelon surfaces, will not converge. In fact, this focusing deviation is at its maximum for radiation incident at a corner of the crossed linear echelon surfaces. The inability of crossed linear echelon surfaces to focus all incident radiation to a point is called "crossed-cylinder aberration." This crossed-cylinder aberration is illustrated in U.S. Pat. No. 4,118,114, Anderson et al, entitled Improved Low-Glare Overhead Projector, also assigned to the assignee of the present invention. Thus, while radiation concentrators using crossed linear echelon surfaces can be made very large, the efficiency of a given array is limited to a value substantially less than that possible without any crossed cylinder aberration.

The efficiency of radiation concentrators, and in particular, solar concentrators, can be judged by measuring the radius around the point of focus of the radiation concentrator where 95% of all incident radiation will be focussed. This radius is known as the 95% energy containment radius, $R_{95}$. The smaller the $R_{95}$, the better and more efficient the radiation concentrator. Another number utilized to judge the efficiency of radiation concentrators is a number known as the geometric concentration ratio, GCR. The geometric concentration ratio may be calculated from the 95% energy containment radius by multiplying the length and width of the radiation concentrator and dividing that by pi times the 95% energy containment radius squared. In equation form, the geometric concentration ratio can be calculated as follows:

$$GCR = \frac{\text{length} \times \text{width}}{\pi \times (R_{95})^2}$$

Traditional radiation concentrators utilizing crossed linear echelon surfaces typically have a geometric concentration ratio of less than 100. For a radiation concentrator having a length and a width of approximately 12 units and a focal distance of approximately 12 units, the $R_{95}$ value is typically on the order of or greater than one unit.

There is desired a point focus radiation concentrator, particularly for solar radiation, which provides the focusing accuracy (efficiency) of an annular echelon lens with the large size capability of a lens using crossed linear echelon surfaces.

SUMMARY OF THE INVENTION

A point focus radiation concentrator has two linear echelon surfaces crossed at approximately 90 degrees with the two linear echelon surfaces having a generally cylindrical shape with a radius of curvature approximately equal to the focal distance of the radiation concentrator.

In one embodiment, a concentrator is used for refracting incident radiation to a point focus. A first linear echelon surface is used having a plurality of linear echelon elements and having an axis parallel to the plurality of linear echelon elements. A second linear echelon surface is also utilized having a plurality of linear echelon elements and having an axis parallel to the plurality of linear echelon elements. The axis of the first linear echelon surface is oriented at approximately 90 degrees to the axis of the second linear echelon surface. Further, the first and second linear echelon surfaces are curved in two dimensions about the axis of the first linear echelon surface with a radius of curvature approximately equal to the focal distance of the concentrator. Each of the plurality of linear echelon elements of the first linear echelon surface are individually oriented to refract to the point focus all of the radiation incident along a curved segment orthogonal to and intersecting the axis of the first linear echelon surface at a center point drawn parallel to the radiation from the point focus. Further, each of the plurality of linear echelon elements of the second linear echelon surface are individually oriented to refract to the point focus all of the radiation incident along a line orthogonal to and intersecting the axis of the second linear echelon surface at the center point. Constructed in this manner, all of the solar radiation incident on the solar concentrator is refracted to an area near the point focus.

The two linear echelon surfaces may be formed on facing sides of two separate sheets or may be formed on opposite sides of a single sheet.

The concentrator may be formed with the angle of orientation of each of the plurality of linear echelon elements of the first linear echelon surface completely independent of the angle of the orientation of the corresponding linear echelon element of the plurality of linear echelon elements of the second-linear echelon surface. Alternatively, cost savings may be obtained and little efficiency lost by making the angle of the orientation of each of the plurality of linear echelon elements of the first linear echelon surface equal to the angle of the orientation of the corresponding linear echelon element of the plurality of linear echelon elements of the second linear echelon surface for a portion of the distance away from the center point of the concentrator toward the edge of the concentrator.

The concentrator may be constructed where the cross section of the first and second linear echelon surface taken orthogonal to the axis of the first linear echelon surface is circular. Alternatively, a concentrator may be constructed where that cross section is parabolic, hyperbolic or ellipsoid.

With the curvature of the linear echelon surfaces of the concentrator, with the radius of curvature which approximates the focal distance of the concentrator, the "crossed-cylinder aberration" unexpectedly disappears. This remarkable characteristic is even more unexpected in that a simple two-dimensional curvature is all that is required to eliminate the crossed-cylinder aberration. It is not even necessary to have a three dimensional curvature, e.g. spheroid.

With the curvature of the linear echelon surfaces, radiation incident on the solar concentrator at any point on its surface is refracted to the point focus. This is contrasted with the planar crossed linear echelon surfaces where radiation incident only along the orthogonal meridians converge.

With complete convergence of the incident radiation, the efficiency of the concentrator is greatly improved. With a radius of curvature approximately equal to the focal distance, a theoretical geometric concentration ratio approximates 450,000 and with the same concentrator dimensions as used for the example of the planar crossed linear echelon surfaces, a 95% radiation concentration radius is shown to be approximately 0.01 units. Thus, the improved concentrator of the present invention increases the theoretical geometric concentration ratio from less than 100 to approximately 450,000. Likewise, it has lowered the 95% energy containment radius from approximately one unit to approximately 0.01 units. These improvements in efficiency are improvements of several magnitudes and result in a greatly more efficient concentrator.

BRIEF DESCRIPTION OF THE DRAWINGS

The foregoing advantages, construction and operation of the present invention will become more readily apparent from the following description and accompanying drawings in which.

DESCRIPTION OF THE PREFERRED EMBODIMENTS

The radiation concentrator of the present invention is particularly useful for concentrating solar radiation. Solar radiation, due to its origin an extreme distance from the position of the radiation concentrator is nearly parallel at the radiation concentrator. That is, every ray of solar radiation is parallel to every other ray of solar radiation. While the concentrator of the present invention may be utilized to concentrate radiation from other sources, it is primarily useful where that radiation is also parallel or nearly parallel. Thus, throughout the following description, it will be assumed that all radiation being concentrated is parallel.

Figure 1:
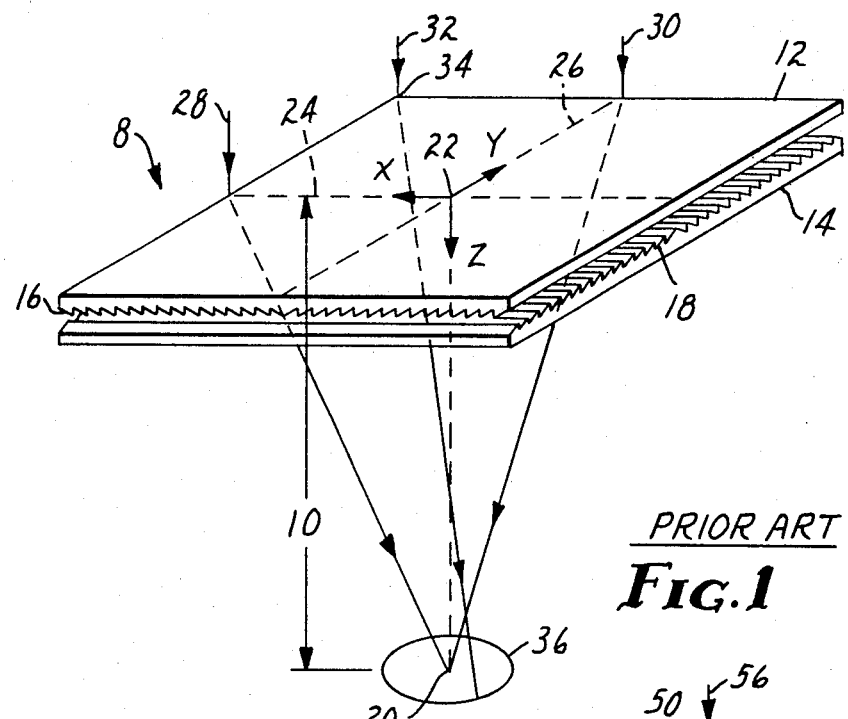
FIG. 1 is a prior art isometric view of a concentrator utilizing planar crossed linear echelon surfaces.

FIG. 1 illustrates a prior art concentrator 8 having a focal distance 10 and having a first linear echelon surface 12 crossed at approximately 90° with a second linear echelon surface 14. The individual linear echelon elements 16 of the linear echelon surface 12 are formed on the underside of linear echelon surface 12. The individual linear echelon elements 18 are formed on the upper surface of linear echelon surface 14. Concentrator 8 attempts to focus all incident radiation to point focus 20. A line drawn parallel to the incident radiation from point focus 20, the optic axis, intersects first and second linear echelon surfaces 12 and 14 at center point 22. Line 24 is drawn orthogonal to the axis, i.e. parallel to the individual linear echelon elements 16, of first linear echelon surface 12 through center point 22. Similarly, line 26 is drawn orthogonal to the axis, i.e. parallel to the individual linear echelon elements 18, of second linear echelon surface 14 also intersecting point 22. Lines 24 and 26 comprise the orthogonal meridians of the concentrator 8. With the proper selection of the angle of the individual linear echelon elements 16 and 18, radiation incident along lines 24 and 26 can be made to intersect at point focus 20. This is illustrated by radiation ray 28 incident at one side of the concentrator 8 along line 24. Ray 28 is refracted by one of the individual linear echelon elements 16 and one of the linear echelon elements 18 to point focus 20. Similarly, radiation ray 30 is also refracted to point focus 20. However, radiation rays which are not incident along lines 24 and 26 will not be focussed exactly to point focus 20. The deviation from the point focus 20 will vary depending upon the position from which the ray is incident on the concentrator 8 and will be at a maximum for radiation incident at a corner of the concentrator 8. This is illustrated by radiation ray 32 incident on the concentrator 8 at corner 34. Ray 32 instead of being refracted to point focus 20 is instead refracted to an area surrounding point focus 20 at the focal distance 10 shown by circle 36. This deviation due to the lack of rotational focusing symmetry is known as crossed-cylinder aberration. This focusing aberration focusing incident radiation at points around point focus 20 into the area enclosed by circle 36 limits the theoretical geometric concentration ratio attainable for concentrator 8 to less than 100.

Figure 2:
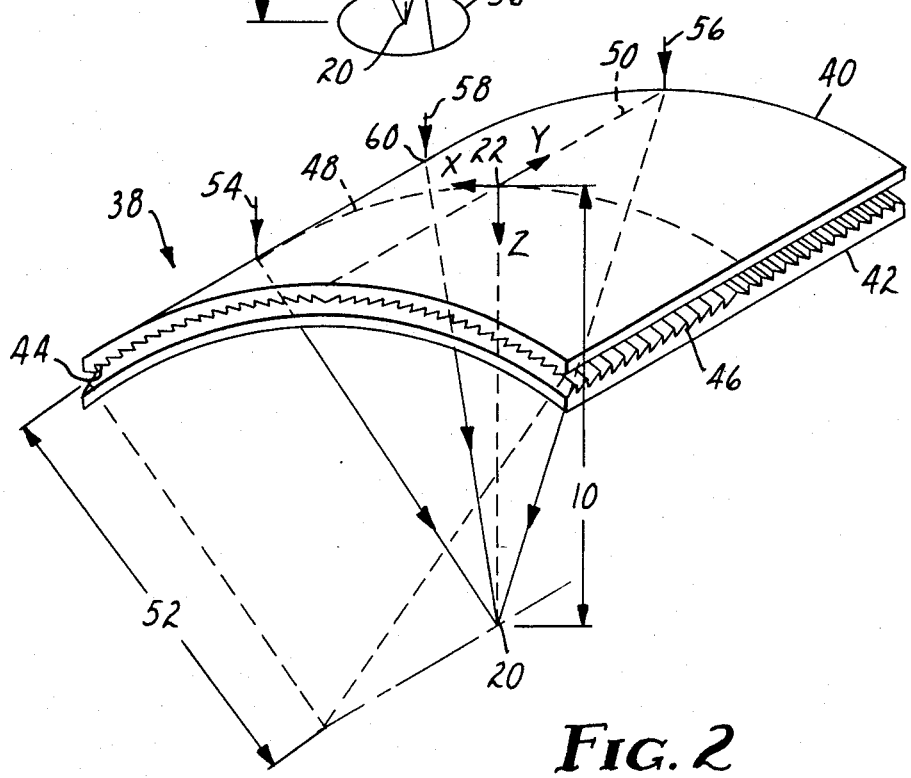
FIG. 2 is a concentrator utilizing curved crossed linear echelon surfaces of the present invention.

The concentrator 38 of the present invention is illustrated in FIG. 2. Concentrator 38, like the concentrator 8 in FIG. 1 has a point focus 20 at a focal distance 10 and has a first linear echelon surface 40 and a second linear echelon surface 42. Also, similarly, linear echelon surface 40 has on its lower surface a plurality of individual linear echelon elements 44 and linear echelon surface 42 has on its upper surface a plurality of linear echelon elements 46. Line 48 is formed on linear echelon surface 40 by drawing a line orthogonal to the axis, i.e. parallel to the individual linear echelon elements 44, of linear echelon surface 40 which intersects the center point 22. Similarly, line 50 is drawn orthogonal to the axis, i.e. parallel to individual linear echelon elements 46, of linear echelon surface 42 and also intersects center point 22.

However, the concentrator 38 of FIG. 2 differs greatly from the concentrator 8 in FIG. 1 in that the linear echelon surfaces 40 and 42 are not planar. Instead, the linear echelon surfaces 40 and 42 are curved in two dimensions around line 50 to form a segment of a cylindrical shape. This curvature has a radius of curvature 52. It has been found that the optimum radius of curvature 52 is that where the radius of curvature 52 equals or approximates the focal distance 10. Notice that in this curved configuration line 48 is now a curved line segment. While line 50 remains linear since the curvature has been done around line 50.

The individual linear echelon elements 44 and 46 may be constructed such that radiation incident along lines 48 and 50 are refracted to converge to point focus 20. This may be done, of course, as in FIG. 1 where radiation incident along lines 24 and 26 are refracted to converge at point focus 20. This is illustrated by radiation ray 54 incident at one side of line 48 which is refracted to point focus 20. Similarly radiation ray 56 incident at one edge of line 50 is also refracted to point focus 20. What is surprising is that radiation incident at all other points on the surface of the concentrator 38 are also converged to point focus 20. This can be illustrated by the radiation ray 58 which is incident at the corner of concentrator 38. Since ray 58 is incident at the corner it could be expected to have the maximum deviation from point focus 20. It could also be expected to be the ray which would be the most out of focus if there were one. In fact, ray 58, incident at corner 60, is refracted by one of the individual linear echelon elements 44 and one of the individual linear echelon elements 46 to point focus 20. In fact, it can be shown that all rays incident on the surface of the concentrator 38 are refracted to converge to point focus 20. It is unique that there is one radius of curvature 52 for which this characteristic is true. That one radius of curvature 52 is where the radius of curvature 52 is approximately equal to the focal distance 10. When rays 54, 56 and 58 are closely converged to point focus 20, then all rays incident on the concentrator 38 are closely converged to point focus 20. The cylindrical curvature of linear echelon surfaces 40 and 42 results in a significant increase in the theoretical, achievable concentration ratio. The fact that a simple two dimensional curvature of the linear echelon surfaces 40 and 42 is sufficient to bring all rays incident on the concentrator 38 in close proximity to point focus 20 enables a much greatly simplified formation of a large area, high power radiation concentrator.

Figure 3:
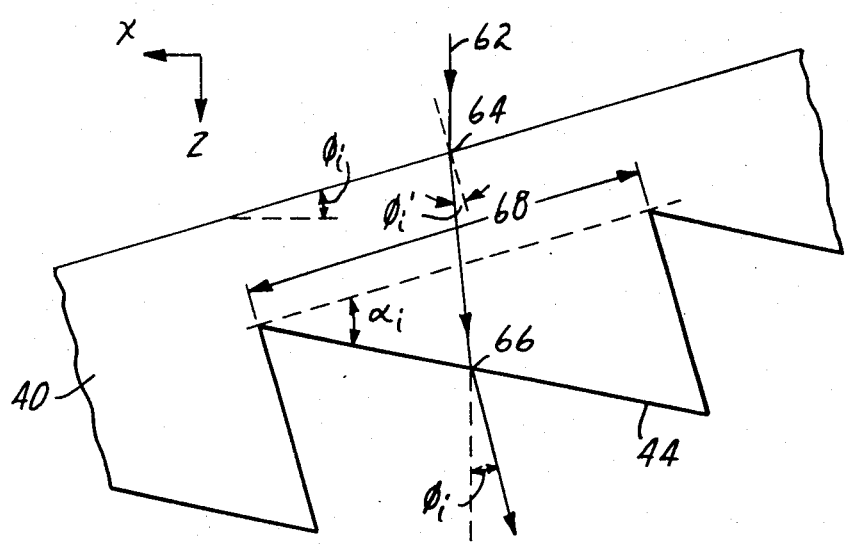
FIG. 3 is a schematic ray trace of the first linear echelon surface.

FIG. 3 shows a schematic ray trace for a single echelon element 44 of the first linear echelon surface 40. The cross section is taken in the XZ plane of the coordinate system illustrated in FIG. 2. The top surface of the linear echelon surface 40 is a curved line segment. Radiation ray 62 is incident at point 64 on the top surface of the linear echelon surface 40. At point 64, the top surface of the linear echelon surface 40 has an angle $\phi_i$ with respect to the XZ plane. Ray 62 is refracted at point 64 where the ray enters linear echelon surface 40 at an angle of refraction $\phi_i'$ and is refracted again at point 66 where ray 62 leaves the linear echelon surface 40 at individual linear echelon element 44. Linear echelon element 44 has an angle $\alpha_i$ with respect to the top surface of the linear echelon surface 40. Ray 62 leaves linear element 44 at an angle $\phi_i$ with respect to a line drawn parallel to the incident radiation. Echelon width 68 represents the width of the individual linear echelon element 44. The values of the angles of the individual linear echelon elements 44 for the first linear echelon surface 40 which would by themselves converge to a line drawn through the point focus 20 along the Y axis are given by the equation:

$$\alpha_i = \text{ARCTAN}\left(\frac{\text{SIN}(\phi_i) - n_d \times \text{SIN}(\phi_i - \phi'_i)}{n_d \times \text{COS}(\phi_i - \phi'_i) - \text{COS}(\phi_i)}\right) + \phi_i$$

Where $n_d$ is the design refractive index of the material used for the linear echelon surface 40.

Figure 4:
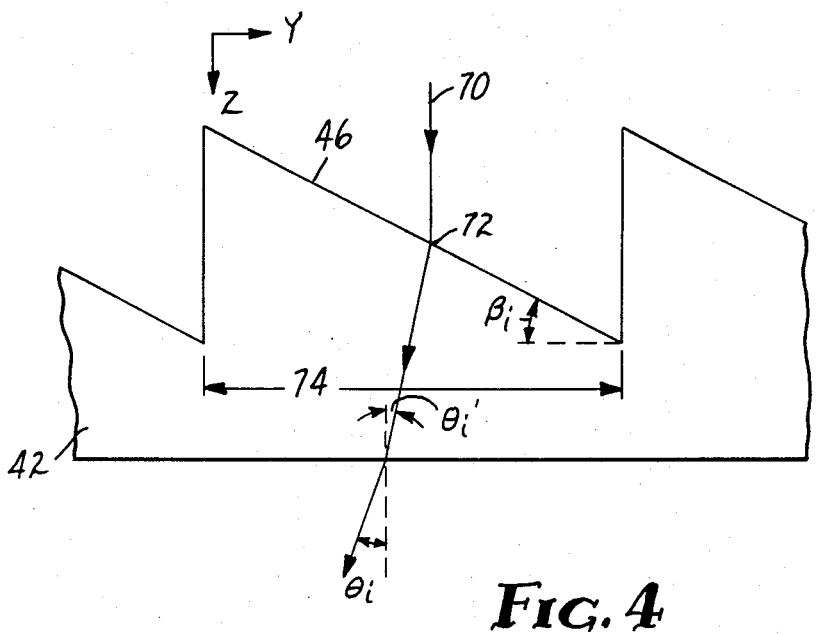
FIG. 4 is a schematic ray trace of the second linear echelon surface.

FIG. 4 shows a schematic ray trace of a linear echelon element 46 of the linear echelon surface 42. The diagram in FIG. 4 is a cross sectional view taken in the YZ plane of FIG. 2 along line 50. Here ray 70 is incident at point 72 along the surface of linear echelon element 46. The angle of the linear echelon element 46 is $\beta_i$. Since linear echelon surface 42 is not curved in this cross section, the angle $\beta_i$ is true with respect to the lower surface of linear echelon surface 42 and with respect to the Y axis. Ray 70 is refracted at point 72, is incident at the lower surface of linear echelon surface 42 at angle $\theta_i'$ and exits at angle $\theta_i$. Linear echelon element 46 has an element width 74. The values of the angle of each individual linear echelon element 46 for the linear echelon surface 42 are given by the equation:

$$\beta_i = \text{ARCSIN}\left(n_d \times \text{SIN}\left(\text{ARCTAN}\left(\frac{\text{SIN}(\theta'_i)}{n_d - \text{COS}(\theta'_i)}\right)\right)\right)$$

The equation given for calculating the angle $\alpha_i$ for the angle of linear echelon element 44 accounts for the curvature of the linear echelon surface 40. However, the equation for $\beta_i$, the angle of the individual linear echelon element 46 of the linear echelon surface 42 neglects the curvature of linear echelon surface 42. Both equations, for $\alpha_i$ and $\beta_i$, neglect the interaction of the refraction of one linear echelon surface on the other.

The angles of the individual linear echelon elements 44 of the linear echelon surface 40 and the individual angles of the individual linear echelon elements 46 of the linear echelon surface 42 may be obtained as follows. The equations for $\alpha_i$ and $\beta_i$ previously given are calculated and are used as initial values for the angles of the echelon elements of the concentrator 38. Skew or three dimensional ray traces are then made for all rays incident along lines 48 and 50 of the concentrator 38 in FIG. 2 and the angles $\alpha_i$ and $\beta_i$ are adjusted until all rays incident are converged to point focus 20. The skew ray traces account for the curvature of both linear echelon surfaces (40 and 42) and the interaction between the linear echelon surfaces (40 and 42). When all rays incident along lines 48 and 50 converge at point focus 20 the design is fixed and all normal radiation incident on the concentrator 38 will closely converge at point focus 20. In general, $\alpha_i$ and $\beta_i$ are not equal for a given distance from center point 22. For a given distance from center point 22 the angle of the linear echelon elements 44 are not equal to the angle of the linear echelon element 46. That is, they do not have full equivalent profiles.

To illustrate the angles of the individual linear echelon elements 44 and 46, and to illustrate the effectiveness of the concentrator 38, a specific design example will be utilized. The exemplary concentrator 38 has a size of 12 units of arc width by a length of 12 units of linear length. The concentrator 38 also has a focal distance of 12 units and a radius of curvature of 12 units. The material utilized for the linear echelon surfaces 40 and 42 is acrylic plastic with a design refractive index, $n_d$ of 1.491. Other optical materials could also be used. The thickness of the linear echelon surfaces 40 and 42 are 0.002 units and the element width 68 and 74 is 0.0005 units.

Figure 5:
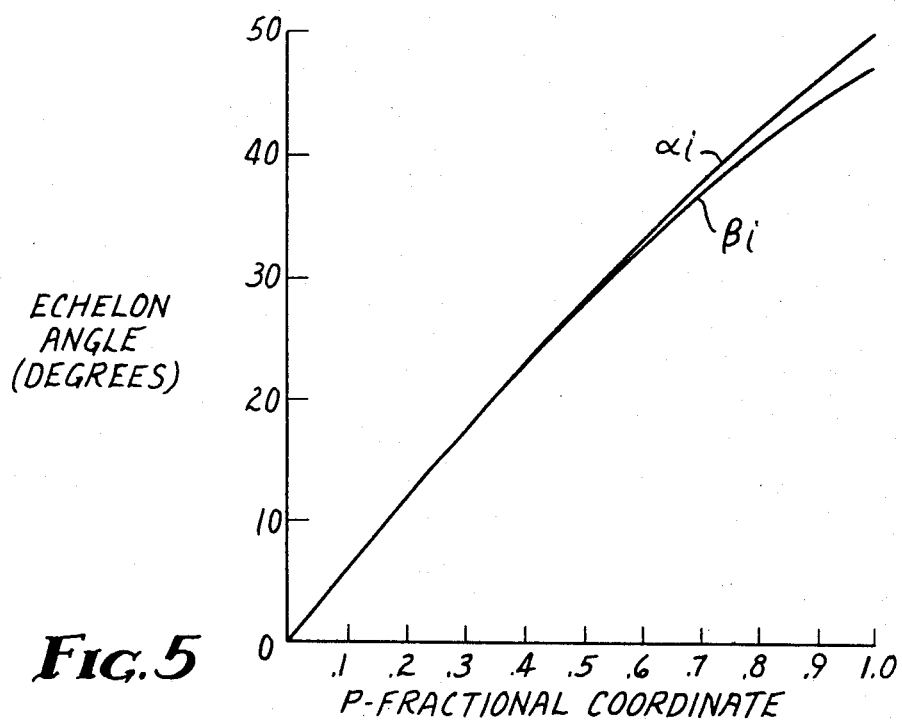
FIG. 5 is an exemplary graph showing the angle of orientation of each individual linear echelon element for both the first and second linear echelon surfaces.

Utilizing this design example, FIG. 5 illustrates in graphical format the particular angle, $\alpha_i$ and $\beta_i$ of the individual linear echelon elements 44 and 46, respectively. The vertical axis in the graph of FIG. 5 is dimensioned in degrees and the horizontal axis is dimensioned in a fractional coordinate $\rho$. $\rho$ is measured along the diagonal from center point 22, where $\rho=0$ to the corner of the concentrator 38, where $\rho=1$. As can be seen in the graph of FIG. 5, the angular difference between $\alpha_i$ and $\beta_i$ is only 0.071 degrees where $\rho=0.25$ and only 0.501 degrees where $\rho=0.5$. Larger differences in the angle between $\alpha_i$ and $\beta_i$ do not show up until $\rho=0.75$ where the difference is 1.395 degrees and the ultimate difference where $\rho=1.0$ is 2.664 degrees. Thus, it can be seen that while the values of $\alpha_i$ and $\beta_i$ are not equivalent, the difference in the angles is small throughout a substantial portion of the fractional coordinate and where $\rho=\frac{1}{2}$ it has been shown that the difference is only $\frac{1}{2}$ of a degree. The angles of $\alpha_i$ and $\beta_i$ for other design examples may be readily constructed from the equations and methods provided.

Figure 6:
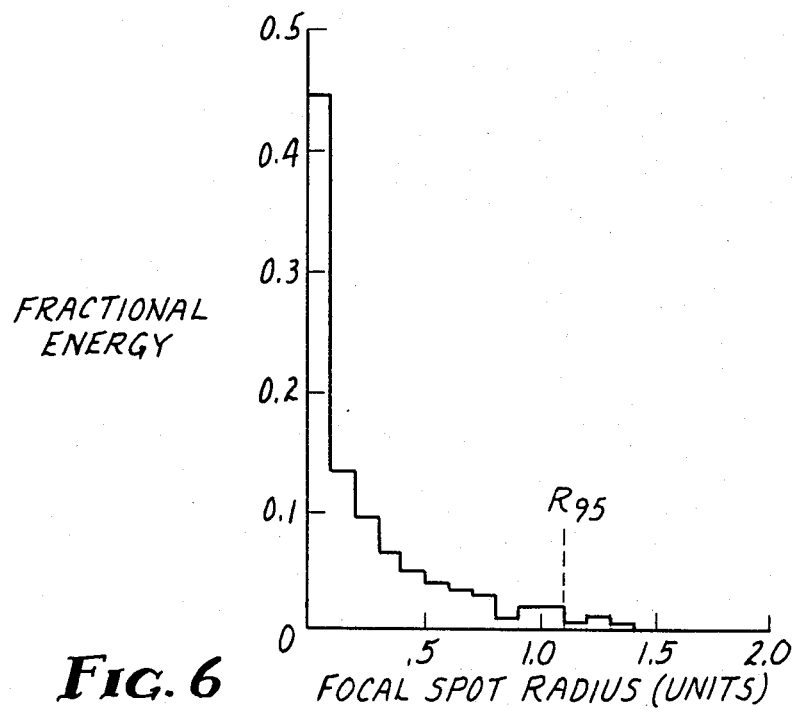
FIG. 6 is a graph illustrating the fractional energy distribution of an exemplary concentrator utilizing a planar crossed linear echelon surface configuration.

Using the design example, FIG. 6 illustrates the fractional energy distribution of the concentrator 8 of FIG. 1 utilizing the width and length and focal distance of the design example. The vertical axis represents the fractional energy incident and the horizontal axis represents the radius from the point focus 20. It can be seen in FIG. 6 that the 95% energy containment radius, $R_{95}$, is approximately 1.1 units.

Figure 7:
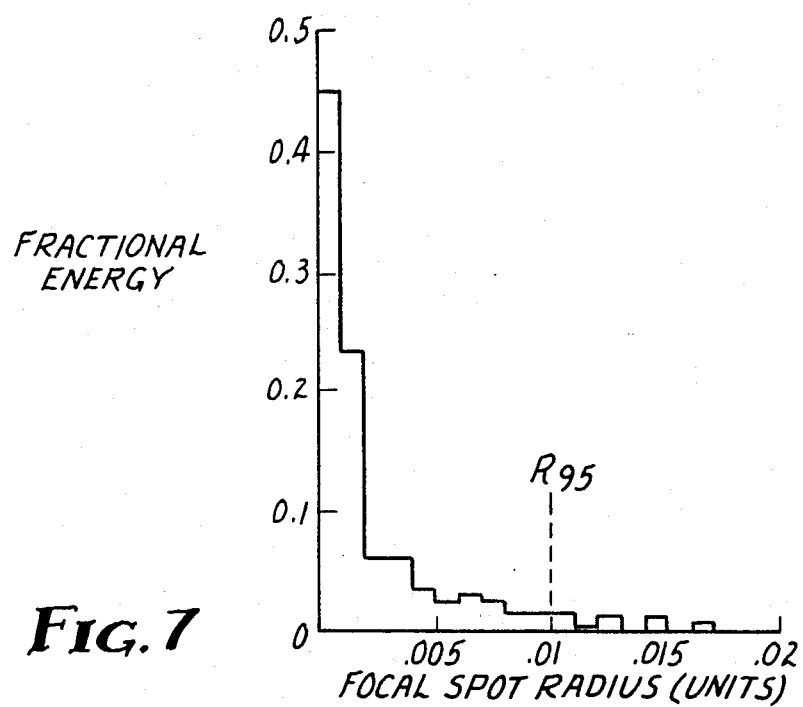
FIG. 7 is a graph illustrating the fractional energy distribution for an exemplary concentrator of the present invention using a full non-equivalent echelon element profile.

The efficiency of the concentrator 38 of the present invention can be illustrated by the fractional energy distribution graph of FIG. 7. FIG. 7 represents the fractional energy distribution for the concentrator 38 of FIG. 2 utilizing the Figures of the design example. It can be seen that the 95% energy containment radius, $R_{95}$ is approximately 0.01 units. This is contrasted with the $R_{95}$ value for the planar configuration shown in FIG. 6 of approximately 1.1 units. This is an improvement in efficiency of the concentrator 38 of FIG. 2 of two orders of magnitude. The theoretical geometric concentration ratio utilizing an $R_{95}$ value of 0.01 is approximately 450,000. This is contrasted to the theoretical geometric concentration ratio for the planar configuration utilizing the $R_{95}$ value of 1.1 of less than 100. Again, this is a difference of several orders of magnitude. Although it is realized that chromatic dispersion, solar collimation, tracking and slope errors may reduce this theoretical geometric concentration ratio, it is necessary that the theoretical geometric concentration ratio be as large as possible in order that a high energy concentration can be achieved. Of course, the theoretical $R_{95}$ value obtainable is limited due to the width 68 and 74 of the linear echelon elements 44 and 46. That is, it is impossible to achieve a focusing accuracy having a radius of less than $\frac{1}{2}$ the width 68 and 74, since all rays incident on a single echelon element will be refracted in parallel and cannot be further converged.

Figure 8:
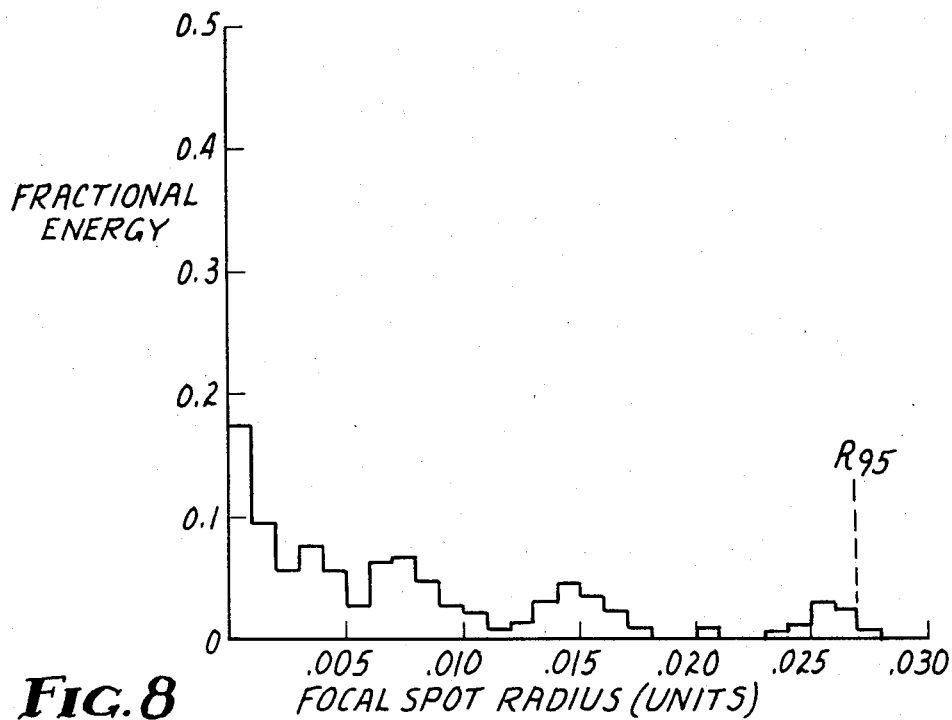
FIG. 8 is a graph illustrating the fractional energy distribution of an exemplary concentrator of the present invention utilizing a half equivalent linear echelon element profile.

As has been shown in FIG. 5, the difference in the values of $\alpha_i$ and $\beta_i$ is only about $\frac{1}{2}$ degree up to the value $\rho$, the fractional coordinate, of 0.5. When a large concentrator is constructed using the matrix sectioning technique, considerable savings may be utilized by cutting identical linear echelon surfaces 40 and 42 where $\rho$ is less than 0.5 identical, eliminating the differences in the angles $\alpha_i$ and $\beta_i$, while retaining non-equivalent linear echelon surfaces 40 and 42 for those positions in the matrix where $\rho$ exceeds 0.5. This is known as a partial equivalent profile. Where $\rho=0.5$ for the dividing line, a half equivalent profile is defined. Such a half equivalent profile reduces the number of master cuttings required, and hence, the cost and complexity of the concentrator 38. The fractional energy distribution of a half equivalent profile concentrator is illustrated in graphical form in FIG. 8. The $R_{95}$ energy containment radius has expanded to approximately 0.027 units or approximately 2.5 times the $R_{95}$ for the non equivalent profile system of FIG. 7, but note that this is still much, much less than the $R_{95}$ value of 1.1 units for the planar configuration of FIG. 6.

Figure 9:
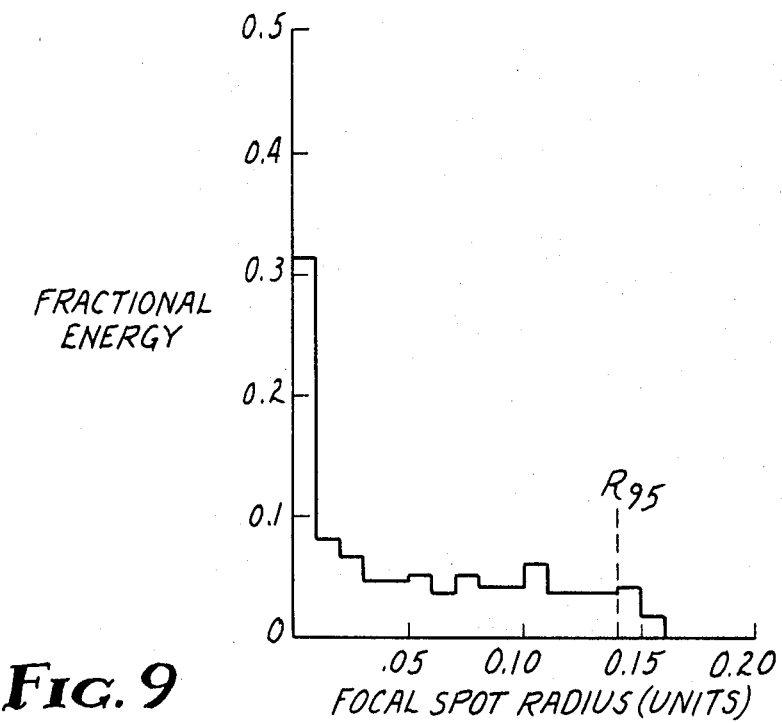
FIG. 9 is a graph illustrating the fractional energy distribution of an exemplary concentrator of the present invention utilizing a full equivalent linear echelon element profile, and an aspheric cross section.

FIG. 9 illustrates the fractional energy distribution of a full equivalent profile. That is, a profile where the linear echelon surfaces 40 and 42 are made identical and $\alpha_i$ and $\beta_i$ equal each other over the entire range of $\rho$ from 0 to 1. In order to improve convergence to the point focus 20 for the full equivalent profile, the cross section of concentrator 38 has been reshaped into an aspheric two dimensional form. The cross section of the curvature of the concentrator 38 may be given by the equation:

$$Z = \frac{CX^2}{1 + \sqrt{1 - (K + 1)C^2X^2}}$$

where C is the vertex curvature and K is the conic constant. Where K is zero the cross section is circular. Where K is less than $-1$, the cross section is hyperbolic. Where K is greater than $-1$ but less than 0, the cross section is an oblate ellipse. Where K is equal to $-1$, the cross section is parabolic and where K is greater than zero, the cross section is a prolate ellipse. For purposes of the full equivalent profile, a K of $-3$ has been chosen. The resulting fractional energy distribution is illustrated in FIG. 9. The resulting $R_{95}$ value of 0.14 units is about 14 times the value for the full non-equivalent profile system; however, it is significantly less than the planar system.

In general, the value of the 95% energy containment radius decreases as the amount of echelon element profile equivalence increases, i.e. decreases with the amount of equivalence between $\alpha_i$ and $\beta_i$. This is true even where the cross section is aspherized with a K value other than 0, e.g. $-3$. Depending upon the efficiency requirements of the concentrator, different equivalent echelon element profiles could be used. For example, either full non-equivalent profiles, partial equivalent profiles such as half equivalent profiles, or full equivalent echelon element profiles could be used. Aspherization of the cross section could be applied to any of these configurations although the K value of $-3$ was specifically used for the full equivalent profile in order to improve the point focus 20.

Figure 10:
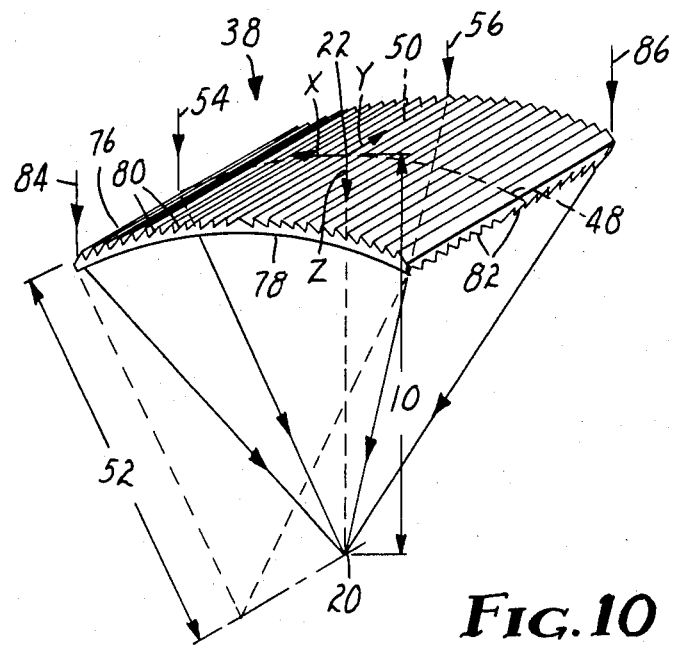
FIG. 10 is an isometric view of a concentrator of the present invention having the first and second linear echelon surfaces on opposite sides of a single sheet.

In one embodiment of the present invention illustrated in FIG. 10, a concentrator according to the present invention is constructed using a first linear echelon surface 76 having linear echelon elements 80 on the upper surface and having a second linear echelon surface 78 having linear echelon elements 82 on the lower surface of a single sheet of, for example, acrylic plastic. The concentrator again has a point focus 20 at a focal distance 10 and has a radius of curvature 52 approximately equal to the focal distance 10. As in FIG. 2, the concentrator has a center point 22 through which curve line segment 48 and straight line 50 intersect. Radiation incident along lines 48 and 50 can be made to converge to point focus 20 by the proper selection of linear echelon elements 80 and 82. Thus, radiation ray 54 incident at the edge of line 48 and radiation ray 56 incident at the edge of line 50 both converge to point focus 20. Similarly, the radiation rays 84 and 86 incident at the corners of the concentrator are also refracted to converge at the point focus 20. A similar analysis used to describe FIG. 2 also applies in FIG. 10.

Thus, it can be seen that there has been shown and described a novel point focus radiation concentrator. It is to be understood, however, that various changes, modifications and substitutions in the form of the details of the described concentrator can be made by those skilled in the art without departing from the scope of the invention as defined by the following claims.

What is claimed is:

1. A point focus refracting radiation concentrator having a focal distance from said concentrator to said point focus comprising:
two linear echelon surfaces each having a plurality of linear echelon elements, said two linear echelon surfaces being crossed at approximately 90° and being curved into a generally cylindrical shape with a radius of curvature approximately equal to said focal distance.

2. A radiation concentrator as in claim 1 wherein a cross-section of said cylindrical shape is circular.

3. A concentrator as in claim 1 wherein said first linear echelon surface and said second linear echelon surface are formed on separate sheets with said first and said second linear echelon surfaces facing each other.

4. A concentrator as in claim 1 wherein said first linear echelon surface and said second linear echelon surface are formed on opposite sides of a single sheet.

5. A concentrator for refracting incident radiation to a point focus, said concentrator having a focal distance being the distance from said concentrator to said point focus, comprising:
first and second linear echelon surfaces, each having a plurality of linear echelon elements and each having an axis parallel to said plurality of linear echelon elements;
said axis of said first linear echelon surface being oriented at approximately 90° to said axis of said second linear echelon surface;
said first and second linear echelon surfaces being curved in only two dimensions about said axis of said first linear echelon surface and having a radius of curvature approximately equal to said focal distance;
said linear echelon elements of said first and second linear echelon surfaces being individually oriented to refract to said point focus substantially all of said radiation incident on said concentrator.

6. A concentrator as in claim 5 wherein a cross-section of said first and second linear echelon surfaces taken orthogonal to said axis of said first linear echelon surface is circular.

7. A concentrator as in claim 5 wherein said first linear echelon surface and said second linear echelon surface are formed on separate sheets with said first and said second linear echelon surfaces facing each other.

8. A concentrator as in claim 5 wherein said first linear echelon surface and said second linear echelon surface are formed on opposite sides of a single sheet.

9. A concentrator for refracting incident radiation to a point focus said concentrator having a focal distance being the distance from said concentrator to said point focus, comprising:
a first linear echelon surface having a plurality of linear echelon elements and having an axis parallel to said plurality of linear echelon elements; and
a second linear echelon surface having a plurality of linear echelon elements and having an axis parallel to said plurality of linear echelon elements;
said axis of said first linear echelon surface being oriented at approximately 90° to said axis of said second linear echelon surface;
said first linear echelon surface and said second linear echelon surface being curved in only two dimensions about said axis of said first linear echelon surface and having a radius of curvature approximately equal to said focal distance;
each of said plurality of linear echelon elements of said first linear echelon surface being individually oriented to refract to said point focus all of said radiation incident along a curved segment orthogonal to and intersecting said axis of said first linear echelon surface at a center point drawn parallel to said solar radiation from said point focus;
each of said plurality of linear echelon elements of said second linear echelon surface being individually oriented to refract to said point focus all of said radiation incident along a line orthogonal to and intersecting said axis of said second linear echelon surface at said center point;
whereby all of said solar radiation incident on said concentrator is refracted to near said point focus.

10. A concentrator as in claim 9 wherein a cross-section of said first linear echelon surface and said second linear echelon surface taken orthogonal to said axis of said first linear echelon surface is circular.

11. A concentrator as in claim 9 wherein a cross-section of said first linear echelon surface and said second linear echelon surface taken orthogonal to said axis of said first linear echelon surface is aspheric.

12. A concentrator as in claim 9 wherein said first linear echelon surface and said second linear echelon surface are formed on separate sheets with said first and said second linear echelon surfaces facing each other.

13. A concentrator as in claim 9 wherein said first linear echelon surface and said second linear echelon surface are formed on opposite sides of a single sheet.

14. A concentrator as in claim 9 wherein the angle of the orientation of each of said plurality of linear echelon elements of said first linear echelon surface is independent of the angle of the orientation of the corresponding linear echelon element of said plurality of linear echelon elements of said second linear echelon surface.

15. A concentrator as in claim 9 wherein the angle of the orientation of each of said plurality of linear echelon elements of said first linear echelon surface are equal to the angle of orientation of the corresponding linear echelon element of said plurality of linear echelon elements of said second linear echelon surface over a portion of distance away from said center point toward the edge of said concentrator.

16. A concentrator as in claim 9 wherein the angle of the orientation of each of said plurality of linear echelon elements of said first linear echelon surface are equal to the angle of orientation of the corresponding linear echelon element of said plurality of linear echelon elements of said second linear echelon surface.

* * * * *